United States Patent

Behar et al.

[11] Patent Number: 5,143,964
[45] Date of Patent: Sep. 1, 1992

[54] ANTISHRINKING UNSATURATED POLYESTER RESIN COMPOSITION

[75] Inventors: Gilles Behar, Saint Aubin; Jean-Claude Oginski, Labourse; Alain Martinet, Saint Nicholas Lez Arras, all of France

[73] Assignee: Cray Valley SA, Puteaux, France

[21] Appl. No.: 681,008

[22] Filed: Apr. 5, 1991

[30] Foreign Application Priority Data

Apr. 5, 1990 [FR] France ................ 90 04354

[51] Int. Cl.$^5$ .............................................. C08K 5/09
[52] U.S. Cl. ................................... 524/400; 523/514; 524/277; 524/494; 524/513
[58] Field of Search ............... 523/514; 524/494, 277, 524/513, 400

[56] References Cited

U.S. PATENT DOCUMENTS

| | | | |
|---|---|---|---|
| 4,140,670 | 2/1979 | Charles et al. | 524/513 |
| 4,284,736 | 8/1981 | Comstock et al. | 524/513 |
| 4,425,287 | 1/1984 | Hesse et al. | 264/22 |
| 4,622,354 | 11/1986 | Iseler et al. | 523/511 |
| 4,835,213 | 5/1989 | Murai et al. | 523/511 |

FOREIGN PATENT DOCUMENTS

| | | |
|---|---|---|
| 2648410 | 4/1978 | Fed. Rep. of Germany . |
| 54-148833 | 11/1979 | Japan . |
| 0062957 | 5/1980 | Japan . |
| 58-103552 | 6/1983 | Japan . |

*Primary Examiner*—Paul R. Michl
*Assistant Examiner*—Tae H. Yoon
*Attorney, Agent, or Firm*—Foley & Lardner

[57] ABSTRACT

A moldable unsaturated polyester resin composition having improved antishrinking and shape-retaining properties contains an unsaturated polyester resin/styrene mixture, fillers, glass fibers, an antishrinkage agent and a demolding agent, wherein the demolding agent is calcium montanate and wherein the antishrinkage agent is preferably a methyl methacrylate polymer. The composition is particularly useful for the manufacture of lamp reflectors having superior shape and weight retention integrity and reduced reflector surface fogging.

18 Claims, No Drawings

ANTISHRINKING UNSATURATED POLYESTER RESIN COMPOSITION

BACKGROUND OF THE INVENTION

The present invention relates to new compositions which are suitable for the manufacture of lamp reflectors. More particularly, the invention relates to new unsaturated polyester resin compositions which are adapted for the manufacture of lamp reflectors for spotlights, fog lamps or moveable headlamps of motor vehicles.

It is known to manufacture bodies in the shape of a dish of a lamp reflector by polymerizing a moldable unsaturated polyester resin composition containing an antishrinkage agent, glass fibers, fillers and a demolding agent. The known antishrinkage agents employed hitherto in the case of the manufacture of lamp reflectors consist most frequently of polyvinyl alcohol, polyurethane, and more rarely of polyethylene or polystyrene. Where demolding agents are concerned, zinc stearate or calcium, lithium, barium or magnesium stearate and the like have most frequently been proposed hitherto.

The present inventors have found that the antishrinkage agents employed hitherto do not make it possible to obtain reflectors having a surface which remains sufficiently perfect with time to maintain high shape integrity and superior optical properties. Where these properties are concerned, the inventors have found that the use of the demolding agents employed hitherto resulted in fogging on the reflecting surface because of the evaporation of the demolding agent which then condensed on the reflecting surface at the elevated temperatures which are encountered while the reflector is in use. Such elevated temperatures result from the use of high-intensity bulbs as a light source and because of the reduction in the volume of reflector parabolas related both to recent changes in aerodynamic and aesthetic factors in reflector lamps. This evaporation of the demolding agent is observed as a loss in the weight of the reflector.

It can be seen that there is therefore a need to develop reflectors which exhibit a minimum loss in weight when heated and which thus retain irreproachable and superior optical properties over time.

SUMMARY OF THE INVENTION

It is an object of the present invention to provide new moldable unsaturated polyester resin compositions which are suitable for the manufacture of lamp reflectors and other products which require moldable resins having superior shape-retaining and anti-shrinking properties.

It is also an object of the invention to provide a new moldable composition which prevents the problems associated with the evaporation of conventional molding agents during use of an object made from a conventional moldable composition.

It is also an object of the invention to produce lamp reflectors with improved shape retention and optical properties.

It is a further object of the invention to provide an improved process for producing lamp reflectors and other products which require moldable resins having superior shape-retaining and anti-shrinking properties.

In accordance with the objects of the invention, the compositions of the invention contain an unsaturated polyester resin/styrene mixture, a filler, glass fibers, an antishrinkage agent and a demolding agent which is the calcium salt of montanic acid.

Still further in accordance with the objects of the invention, a lamp reflector made from a moldable unsaturated polyester resin composition, comprising an unsaturated polyester resin/styrene mixture, a filler, glass fiber, an antishrinkage agent and a demolding agent, wherein the demolding agent comprises a calcium salt of montanic acid, is also provided.

The inventors of the present novel compositions have found that the use of such compositions have made it possible to obtain reflectors which overcome the disadvantages known hitherto.

DETAILED DESCRIPTION OF THE PREFERRED EMBODIMENTS

According to the invention, the demolding agent used in the compositions of the invention is calcium montanate. The term "calcium montanate" used herein denotes the calcium salt of a commercial fatty acid which is predominantly montanic acid of formula $C_{27}H_{55}COOH$ and containing minor amounts of $C_{24}$, $C_{26}$, $C_{30}$ and $C_{32}$ acids. This salt is manufactured from a natural product, montan wax, which is extracted from lignites. This salt is manufactured by oxidizing montan wax with the aid, for example, of a hot sulfuric-chromic mixture, the oxidation products obtained (fatty acids) are then neutralized with calcium compounds such as calcium carbonate or calcium hydroxide. It can be shown by analysis that the commercial product sold under the name of calcium montanate contains approximately 5% of calcium and up to about 3% by weight of free acids.

The present inventors have found that the use of the demolding agent according to the invention now makes it possible to virtually eliminate the disadvantageous condensation phenomenon which has been observed with the demolding agents known hitherto. The elimination of these disadvantages is particularly useful since reflectors having superior non-shrinking, shape-retention and non-condensing characteristics can now be produced. The demolding agent according to the invention is used in an amount of about 1 to 8% by weight relative to the weight of the unsaturated polyester resin/styrene mixture.

According to a preferred embodiment of the invention, the antishrinkage agent used in the compositions of the invention is a methyl methacrylate polymer (PMMA) which has a number average molecular weight of more than 100,000 and preferably close to 130,000. It was found that the use of this PMMA with calcium montanate in the compositions according to the invention made it possible to obtain the best results insofar as the loss in weight of the lamp reflectors is concerned.

In a known manner, the antishrinkage agent is used in a quantity of between about 10 and 20% by weight relative to the weight of the polyester resin/styrene mixture.

In a known manner, lamp reflectors according to the invention are obtained by employing moldable unsaturated polyester resin compositions. These compositions, called "bulk molding compounds" (BMC), consist of unsaturated polyester resins in admixture with styrene, with the addition of an organic peroxide as polymerization catalyst, fillers such as calcium carbonate, from about 10 to 30% by weight of glass fibers, the calcium montanate demolding agent according to the invention and the antishrinkage agent.

After the mixture has been produced, the moldable composition is introduced into a mold of an appropriated shape; the mold is then closed and heated to polymerize the composition. The molding can be carried out by using any of the techniques known in this technology: compression, transfer, injection/compression and injection molding. During the molding the mold is kept at a temperature of about 130° to 180° C. and at a pressure of about 30 to 100 bars for 2 minutes at most.

After demolding, the reflector is then subjected to an aluminizing treatment to produce headlamps. This aluminizing treatment is preferably carried out by precoating the reflector with a polyester, epoxy or acrylic resins varnish.

EXAMPLES

The following examples illustrate the present invention. The quantities are expressed in parts by weight.

Example 1: (Comparative)

A "control" composition is prepared from the following ingredients: the unsaturated polyester resin (having the following characteristics: density: 1.11 g/cm³, viscosity at 25° C.: 20 dPa.S, solids content: 67% is sold by CRAY VALLEY SA under the trademark Norsodyne.

|  | Parts by Weight |
|---|---|
| Unsaturated polyester resin in solution in styrene | 60 |
| Antishrinkage agent consisting of polyurethane (MW approximately 8000, solids content 65%) in solution in styrene | 20 |
| Thermoplastic rubber in solution in styrene, solids content: 30% | 20 |
| Tertiary butyl peroctoate | 2 |
| para-Benzoquinone | 0.02 |
| Calcium carbonate | 240 |
| Organic black colorant | 10 |
| Glass fibers (length: 6 mm) | 60 |
| Calcium stearate | 6 |

Example 2

Another composition is prepared from the following ingredients:

|  | |
|---|---|
| Unsaturated polyester resin in solution in styrene of Example 1 | 60 |
| PMMA as a 40% solution (sold by Altulor under the trademark Altulite P2779 | 40 |
| Tertiary butyl peroctoate | 2 |
| para-Benzoquinone | 0.02 |
| Calcium carbonate | 240 |
| "Calcium montanate", calcium contents: 5.1%, free fatty acids; 3%, moisture at 105° C. 2% This product is sold by MT-Chimie under the trademark Stavinor | 4 |
| Organic black colorant | 10 |
| Glass fibers (6 mm in length) | 60 |

The compositions of Examples 1 and 2 are injection molded at 150° C. in molds for manufacturing lamp reflectors. Table 1 summarizes the results of the measurements performed on the finished products.

TABLE 1

| Characteristics | Example 1 | Example 2 | Example 2 without colorant |
|---|---|---|---|
| Shrinkage (swelling) | +0.12% | +0.04 | +0.04 |
| Losses in weight: | | | |
| ½ h at 200° C. | 0.46% | 0.21% | 0.21% |
| 24 h at 200° C. | 1.23% | 0.49% | 0.57% |

Example 3

Example 2 is repeated, but "calcium montanate" is replaced with calcium stearate.

Example 4

Example 3 is repeated, but 20 parts by weight of PMMA instead of 40 and 20 parts of polyvinyl alcohol are used.

Table 2 which follows, summarizes the results obtained on headlamp parabolas obtained by molding.

TABLE 2

| Characteristics | Example 3 | Example 4 |
|---|---|---|
| Losses in weight: | | |
| ½ h - 200° C. | 0.38% | 0.40% |
| 24 h - 200° C. | 0.90% | 1.10% |

Examples 5 to 7

Example 1 is repeated, but calcium stearate is replaced with an equal weight of various other conventional demolding agents or calcium montanate. Table 3 summarizes the results obtained on headlamp parabolas manufactured by molding.

TABLE 3

| Tests | Demolding agent | Loss in weight ½ h - 220° C. | 24 h - 200° C. |
|---|---|---|---|
| 5 | lithium stearate | 0.24% | 0.77% |
| 6 | magnesium stearate | 0.26% | 0.7% |
| 7 | calcium montanate | 0.17% | 0.60% |

It is apparent from the examples that use of calcium montanate produces lamp reflectors with improved properties, and that further improvement is obtained when calcium montanate is used together with the preferred PMMA antishrinkage agent.

The foregoing description and examples have been set forth merely to illustrate the invention and are not intended to be limiting. Since modifications of the described embodiments incorporating the spirit and substance of the invention may occur to a person skilled in the art, the scope of the invention should be construed to include all variations falling within the ambit of the appended claims and equivalents thereof.

What is claimed is:

1. A moldable unsaturated polyester resin composition comprising an unsaturated polyester resin/styrene mixture, fillers, glass fibers, an antishrinkage agent and a demolding agent, wherein said demolding agent is calcium montanate.

2. A composition according to claim 1, wherein said antishrinkage agent is a methyl methacrylate polymer which has a number average molecular weight of more than 100,000.

3. A composition according to claim 2, wherein said methyl methacrylate polymer has a number average molecular weight of 120,000 to 140,000.

4. A composition according to claim 3, wherein said methyl methacrylate polymer has an average molecular weight of approximately 130,000.

5. A composition according to claim 1 wherein said calcium montanate is present in an amount of 1% to 8% by weight with respect to the weight of said unsaturated polyester resin/ styrene mixture.

6. A composition according to claim 1 wherein said anti-shrinkage agent is present in an amount of 10% to 20% by weight with respect to the weight of said unsaturated polyester resin/styrene mixture.

7. In a process for producing a moldable lamp reflector body, comprising the step of molding a composition comprising an unsaturated polyester resin/styrene mixture, fillers, glass fibers, an antishrinkage agent and a demolding agent, the improvement wherein said demolded agent is calcium montanate.

8. The process according to claim 7 wherein said antishrinking agent is a methyl methacrylate polymer which has a number average molecular weight of more than 100,000.

9. The process according to claim 8 wherein said methyl methacrylate polymer has a number average molecular weight in the range of 120,000 to 140,000.

10. The process according to claim 9 wherein said methyl methacrylate polymer has an average molecular weight of approximately 130,000.

11. The process according to claim 7 wherein said calcium montanate is present in an amount of 1% to 8% by weight with respect to the weight of said unsaturated polyester resin/ styrene mixture.

12. The process according to claim 7 wherein said anti-shrinkage agent is present in an amount of 10% to 20% by weight with respect to the weight of said unsaturated polyester resin/styrene mixture.

13. A lamp reflector made by the process of claim 7.

14. A lamp reflector made by the process of claim 8.

15. A lamp reflector made by the process of claim 9.

16. A lamp reflector made by the process of claim 10.

17. A lamp reflector made by the process of claim 11.

18. A lamp reflector made by the process of claim 12.

* * * * *